United States Patent
Kelly et al.

(10) Patent No.: US 7,139,664 B2
(45) Date of Patent: *Nov. 21, 2006

(54) SYSTEM AND METHOD FOR PROVIDING PERSONALIZED STORM WARNINGS

(75) Inventors: Terence F. Kelly, Madison, WI (US); Victor W. Marsh, Fitchburg, WI (US); Randall T. Wiggins, Madison, WI (US)

(73) Assignee: Weather Central, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,724

(22) Filed: Mar. 28, 2005

(65) Prior Publication Data

US 2006/0036366 A1    Feb. 16, 2006

Related U.S. Application Data

(63) Continuation of application No. 10/649,342, filed on Aug. 27, 2003, now abandoned, which is a continuation of application No. 09/707,104, filed on Nov. 6, 2000, now Pat. No. 6,654,689.

(51) Int. Cl.
    *G01W 1/00* (2006.01)
(52) U.S. Cl. .................................................. 702/3
(58) Field of Classification Search .............. 702/2, 702/3, 4, 5, 15; 342/26 R, 26 A, 26 B, 26 C, 342/26 D, 460
    See application file for complete search history.

(56) References Cited

U.S. PATENT DOCUMENTS

| | | | | | |
|---|---|---|---|---|---|
| 5,278,539 | A | * | 1/1994 | Lauterbach et al. | 340/539.18 |
| 6,018,699 | A | * | 1/2000 | Baron et al. | 702/3 |
| 6,023,223 | A | * | 2/2000 | Baxter, Jr. | 340/531 |
| 6,028,514 | A | * | 2/2000 | Lemelson et al. | 340/539.13 |
| 6,084,510 | A | * | 7/2000 | Lemelson et al. | 340/539.13 |
| 6,167,255 | A | * | 12/2000 | Kennedy et al. | 455/414.1 |
| 6,199,045 | B1 | * | 3/2001 | Giniger et al. | 705/1 |
| 6,252,544 | B1 | * | 6/2001 | Hoffberg | 342/357.1 |
| 6,339,747 | B1 | * | 1/2002 | Daly et al. | 702/3 |
| 6,351,218 | B1 | * | 2/2002 | Smith | 340/601 |
| 6,360,172 | B1 | * | 3/2002 | Burfeind et al. | 702/2 |
| 6,404,880 | B1 | * | 6/2002 | Stevens | 379/221.11 |
| 6,429,812 | B1 | * | 8/2002 | Hoffberg | 342/357.1 |
| 6,505,123 | B1 | * | 1/2003 | Root et al. | 702/3 |
| 6,542,825 | B1 | * | 4/2003 | Jones et al. | 702/3 |

(Continued)

OTHER PUBLICATIONS

U.S. Appl. No. 60/237,984.*

(Continued)

*Primary Examiner*—Donald McElheny, Jr.
(74) *Attorney, Agent, or Firm*—Reinhart Boerner Van Deuren, s.c.

(57) ABSTRACT

A system and method for generating storm warnings which are precisely tailored automatically for a particular individual or business user's geographic location of interest. The user establishes an individualized user profile, in which the user may define a particular location of interest and a contact address to which a personalized storm warning is to be delivered. The user may also establish a storm profile defining characteristics of a storm for which the user desires a storm warning to be provided. A detailed and accurate storm track is generated. Generated storm tracks are compared to individual user profiles. Personalized storm warnings are generated for user profiles defining locations of interest within a predicted storm track, if the storm track characteristics of the storm meet the characteristics specified in the storm profile established by the user, and may be delivered to users via e-mail, cell phone, pager, etc.

27 Claims, 4 Drawing Sheets

U.S. PATENT DOCUMENTS

| | | | | |
|---|---|---|---|---|
| 6,590,529 B1 * | 7/2003 | Schwoegler | ............ | 342/357.13 |
| 6,654,689 B1 * | 11/2003 | Kelly et al. | .................... | 702/3 |
| 2001/0030624 A1 * | 10/2001 | Schwoegler | ............ | 342/357.13 |
| 2002/0042846 A1 * | 4/2002 | Bottan et al. | ................ | 709/249 |

OTHER PUBLICATIONS

U.S. Appl. No. 60/192,114.*
U.S. Appl. No. 60/182,352.*

* cited by examiner

User Profile Set Up

← 42

Name: Terry Kelly ← 44

Contact Address: tkelly@mad.com ← 46

Location: 53701-1497 ← 48

Storm Profile

Storm Characteristics

← 50

☑ Tornado
52

☑ Hail   Size: ½ inch   ← 54

☐ Heavy Rain

Advanced Warning   ← 56

☑ Time: 15 minutes
58
☐ Distance: 15 miles ← 60

FIG. 3

Hello Terry,

Warning!

Severe weather, including ½ inch hail, will arrive at your location in 15 minutes.

SYSTEM AND METHOD FOR PROVIDING PERSONALIZED STORM WARNINGS

This application is a continuation of prior application Ser. No. 10/649,342 filed Aug. 27, 2003, now abandoned, which is a continuation of prior application Ser. No. 09/707,104 filed Nov. 6, 2000, now U.S. Pat. No. 6,654,689.

FIELD OF THE INVENTION

The present invention pertains generally to systems and methods for producing weather reports including systems and methods for tracking the expected future paths of storms and other weather phenomenon, and, more particularly, to systems and methods for providing such weather reports and storm warnings to individuals and businesses, e.g., over computer networks such as the internet.

BACKGROUND OF THE INVENTION

Most of the current weather and weather forecast information used by individuals and businesses is obtained by them from weather reports provided by local television and radio stations. Such reports are typically prepared by meteorologists at a television or radio station serving a particular geographical area, e.g., a large city and surrounding environs. The reports are based on current weather information available to the meteorologists, which may be provided by various local (e.g., local radar) and national (e.g., NEXRAD radar and weather satellite) weather information sources. A meteorologist may also employ computer implemented weather forecasting models in preparing a weather forecast report. A meteorologist may prepare and/or update such reports throughout the day, and such reports may be provided as part of periodic radio and/or television broadcasts. A person who is interested in the current or forecast weather conditions for a geographic location accesses such a weather report by tuning in to the television or radio broadcast of the report at the designated time.

If severe weather threatens a particular area, an emergency radio or television broadcast may be made to provide such information to the public immediately and, if necessary, continuously. For example, a television station may provide a graphic indication of the general location (e.g., county) and nature of severe weather (e.g., tornado and thunderstorm warnings, etc.) as part of its television broadcast, throughout the period during which severe weather threatens an area. Such severe weather or storm warnings may be generated from various different weather information sources and provided in various different manners to the public. For example, a television station may subscribe to National Weather Service weather wire information, which includes weather warning bulletins authored by the National Weather Service Storm Prediction Center, and other related government agencies. The weather warning bulletins include tornado warnings, severe thunderstorm warnings, flash flood warnings, and the like. This information is typically employed by WxWarn, or other systems, for displaying the warning bulletins, e.g., as an overlay on a television broadcast.

NEXRAD weather radar weather information is also obtained from the government by many television stations. NEXRAD information includes a storm attributes table which defines storm cells and provides detailed information concerning the cells, including the characteristics of the cells (e.g., hail and vortex intensity and location, rain fall intensity, speed, etc.) as well as the position, direction, and speed of movement of the cells. A storm cell tracking and display system employed by the television station may use such NEXRAD data to determine the position of a storm and to derive a predicted storm path therefrom. Such a derived storm track may be displayed to viewers, e.g., as part of a severe weather update television report. Such a report may include a display indicating the time that a selected storm or storms is predicted to arrive at a particular city or town, based on the storm track derived from NEXRAD storm attribute information.

Government-provided NEXRAD radar data includes detailed information on storm cells, including detailed information on the characteristics of the cells, including their speed and direction of movement, contents (e.g., hail or tornadoes), etc. This detailed information is obtained by the NEXRAD radar system by performing a volumetric radar scan of the atmosphere. A weather tracking and display system can expect to receive updated NEXRAD weather information no more often than every six (6) minutes. The speed and direction of movement of a severe weather cell can change significantly during this relatively long period between NEXRAD updates. Thus, storm warnings based on the predicted track of a storm cell will become increasingly inaccurate between NEXRAD updates, if NEXRAD information alone is relied upon to determine the predicted track of a storm cell. Local or remote live radar systems perform a much more rapid scan of the atmosphere, and are, therefore, able to provide more up-to-the-minute information on the current location of a severe storm weather cell. Since such live radar systems are significantly less expensive than NEXRAD radar systems, many television news and weather operations have their own live local radar systems, in addition to access to government provided NEXRAD data, which provides much more detailed storm attribute information. U.S. Pat. No. 6,339,747, entitled Weather Tracking and Display System and Method, which is assigned to the assignee of the present application, describes a system and method for employing such live radar information to update the detected position of NEXRAD defined storm cell attributes between NEXRAD updates. Such a system combines the detailed information describing the characteristics of a storm, provided by NEXRAD, with the up-to-the-minute information on the current location of a storm, provided by live radar, to provide more accurate storm warnings.

A limitation of conventional weather reports and storm warnings is that they are generalized over a relatively large geographic area. For example, a typical storm warning may indicate that severe weather, e.g., a tornado, thunderstorm, etc., is present or expected to arrive in a geographic area such as a county. Of course, such severe weather will arrive at different locations in the county at different times, and some areas of a county under a weather warning may not receive any severe weather at all. A county-wide storm warning, therefore, does not provide sufficient information for an individual to know whether or when to expect severe weather at his home, place of work, or other specific location of interest within the county. Televised weather reports which provide expected arrival times of severe weather at specific cities or other populated areas are also of limited value for many individuals. Such reports, which may employ NEXRAD information or NEXRAD information in combination with live radar information to provide accurate storm cell tracking, typically only provide arrival time information for a handful of populated areas in the path of a storm. Those in rural areas and smaller towns in the path of a storm must attempt to estimate on their own, from the graphics provided in the televised weather warning broadcast, if severe weather will reach their area and, if so, when. What is desired, therefore, is a system and method which provides personalized storm or other severe weather warnings to individuals or businesses which indicate whether or not a storm will reach an individual's location of interest and, if so, when.

Another limitation of conventional televised or radio broadcast storm warnings is that such warnings provide information only on the types of storms which are deemed significant by the television or radio station providing the broadcast. If a televised storm warning provides information on all severe weather conditions (e.g., thunderstorms, hail, tornadoes, etc.) occurring in a television station's service area, a viewer may be overwhelmed with information, and miss the particular severe weather information in which he is interested (e.g., a tornado headed toward his home). Alternatively, if a broadcast storm warning report includes information on only selected severe weather conditions, an individual may not be provided with storm warning information which would be valuable to him, and which is available to the television or radio station, but which is not provided in a storm warning report which is directed to a more general audience. Furthermore, conventional televised or radio broadcast storm warnings provide an amount of advanced storm warning which is selected by the television or radio station to satisfy a general audience. This may be too much or too little for any individual interested in when a storm will reach the individual's location of interest. What is desired, therefore, is a system and method which allows an individual to select the particular types of severe weather conditions for which the individual desires a storm warning to be provided, and an amount of advanced warning which such a report will provide.

U.S. Pat. No. 6,018,699, to Baron, Sr. et al. describes a weather alert manager which receives meteorological data, e.g., NEXRAD data, which includes weather information defining storms within a relevant geographic area. The current position and predicted path of a storm is determined from the data and combined with a geographical grid to produce a storm profile indicating storm severity and if a storm is in or is likely to enter any geographical grid area. The storm profile may be distributed to remote units located within a particular grid area to provide storm warnings to individuals in such areas. For example, the remote unit may be a cellular phone or pager which is associated with a particular area, and which receives the storm profile to provide the appropriate warning when a storm is in or approaching that area. Such a system, however, does not allow an individual user to identify a particular location of interest for which the user desires storm warnings to be provided, nor does it allow a user to select the particular storm conditions, advanced warning time, etc. for such a location for which a storm warning is to be provided.

Advances in computer connectivity technology have allowed television and radio station meteorologists to provide access to their latest weather condition and forecast reports via computer over the internet at any time desired. Thus, an individual need not try to catch the local television or radio broadcast of a weather report to get the latest weather information. An individual may be able to access weather reports or other outdoor information for both local and remote geographic locations via computer over the internet. For example, U.S. patent application Ser. No. 09/547,195, entitled System and Method for Providing Personalized Weather Reports and the Like, filed Apr. 12, 2000, and assigned to the assignee of the present application, describes a system and method for providing accurate personalized weather reports to individuals or businesses for individual user locations of interests. Such personalized weather reports may be delivered to users over the internet, via e-mail, via a pager or cellular telephone, etc. Such a system employs a highly accurate weather forecasting model to provide detailed weather forecast information for particular user locations of interest, from which the personalized weather reports are generated periodically, e.g., twice a day. However, a system which also provides personalized up-to-the-minute storm warnings to individuals and businesses during rapidly developing severe weather conditions using, e.g., timely weather radar information, is also desired.

SUMMARY OF THE INVENTION

The present invention provides a system and method for generating storm warnings which are precisely tailored automatically for a particular individual or business user's geographic location of interest, e.g., home or work, and which may be provided automatically to the individual user or business. The present invention allows an individual to identify a particular geographic location for which the user desires a personalized storm warning to be provided, as well as to establish a storm profile, defining attribute characteristics of storms for which a storm warning is desired, and the amount of advanced warning which the personalized storm warning is to provide.

In accordance with the present invention, a user establishes an individualized user profile, in which the user may define a particular location of interest (e.g., home or work) and a contact address (e.g., e-mail address or pager number) to which a personalized storm warning is to be delivered. A user may also establish a storm profile, defining attribute characteristics of a storm for which the user desires a storm warning to be provided, and an amount of advanced warning to be provided by the personalized storm warning. A detailed and accurate storm track is generated. The storm track includes information describing a storm's characteristics (severe weather conditions) as well as the current location and predicted track of movement of the storm. Such a storm track may be generated automatically from weather radar data, such as NEXRAD data, either alone, or in combination with local live weather radar information, and other available weather information. The generated storm track is compared to the individual user profile. For user profiles defining locations of interest within a predicted storm track, and if the storm track characteristics meet the storm attribute and advanced warning characteristics specified in the storm profile, a personalized storm warning is automatically generated. The personalized storm warning thus generated preferably identifies in detail the storm conditions approaching a user location of interest, and the predicted arrival time at that location. A personalized storm warning in accordance with the present invention may be provided directly to an individual or business, e.g., via e-mail, pager, cellular telephone, etc.

An exemplary system for providing personalized storm warnings in accordance with the present invention includes a main computer system, which may be implemented, for example, as part of a television or radio station news and weather reporting operation. The main computer system receives weather information from one or more weather information sources, e.g., NEXRAD weather radar information provided by the government, local live weather radar information, and other weather information from local and/ or remote sensors. NEXRAD weather radar information includes detailed storm attribute information describing the characteristics of storm cells. The NEXRAD storm attribute information also includes information on the direction and speed of movement of storm cells, from which a predicted track of these storms may be generated. The main computer system includes software for generating a predicted storm track from such NEXRAD data, or, more preferably, from NEXRAD data in combination with local live radar information. The local live radar information, which is less detailed, but which provides updated storm cell positions much more often than NEXRAD information, may be used in combination with NEXRAD information to enhance the accuracy of the predicted storm cell tracks.

The main computer system preferably also includes a user profile generator. The user profile generator provides various user profile set-up menu user interfaces which allow a user to establish a user profile. These menus may be accessed by a user by use of, for example, a personal computer connected to the main system computer over a network such as the internet. Using such menus, the user establishes a personal user profile which includes a particular location of interest, e.g., home, vacation home, or work, for which the user would like a personalized storm warning to be provided, and a contact address, e.g., e-mail address or pager number, to which the personalized storm warning is to be delivered. The set-up menu user interface also allows a user to define a storm profile, including storm attribute conditions for which the user would like a personalized storm warning to be provided, and the amount of advanced warning (e.g., based on predicted storm cell arrival time at the user location of interest, or the distance of a storm cell from the user location of interest) which the personalized storm warning is to provide. User and storm profile information thus obtained is stored in a user profile data base.

Each time a storm track is generated or updated, the resulting storm track data is compared to the user profiles saved in the user profile database, and personalized storm warnings are generated automatically by a storm warning generator implemented in the main computer system. Personalized storm warnings are generated for each user location of interest which falls within a projected storm track, if the storm attribute characteristics and advanced warning limitations established by the user in the storm profile are satisfied by the characteristics of the generated storm track.

In accordance with the present invention, personalized storm warnings may be delivered to a user at the user contact address indicated in the user profile, and preferably include detailed information on the contents of an approaching storm, e.g., the types of severe weather that are approaching, as well as the predicted time of arrival of the storm at the specific user location of interest identified by the user in the user profile. Such detailed personalized storm warnings may be delivered automatically directly to a user's contact address, e.g., in the form of an e-mail or phone message. Alternatively, or additionally, personalized storm warnings in accordance with the present invention may be provided at an internet web page accessible at a personalized web page address provided to the user.

A system and method in accordance with the present invention for providing personalized storm warnings based, e.g., on current weather radar information, may be combined with a system or method for providing more long-term personalized weather forecast reports based, e.g., on computer modeled weather data. In such a case, a user may establish a single user profile to obtain both personalized storm warning and weather forecast reports for a specific user location of interest, each of which may be delivered, at the appropriate times, to a user contact address identified by the user in the user profile, and/or to an internet web page accessible at a personalized web page address provided to a user.

Further objects, features, and advantages of the invention will be apparent from the following detailed description taken in conjunction with the accompanying drawings.

BRIEF DESCRIPTION OF THE DRAWINGS

In the drawings:

FIG. 3 is a exemplary user profile set-up menu user interface for use in a system and method for providing personalized storm warnings in accordance with the present invention.

DETAILED DESCRIPTION OF THE INVENTION

Figure 1:
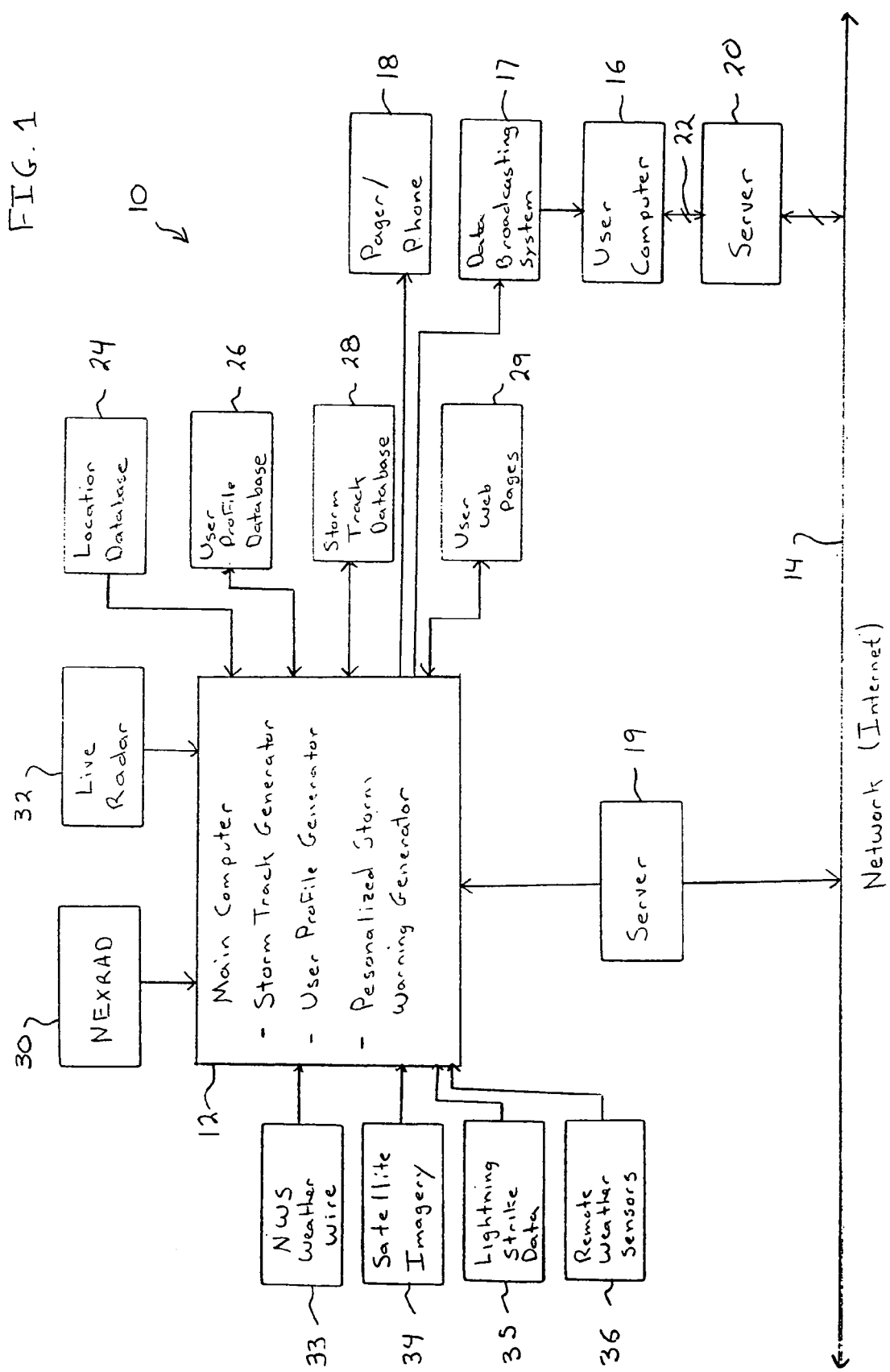
FIG. 1 is a schematic block diagram of an exemplary system for providing personalized storm warnings in accordance with the present invention.

A schematic block diagram of an exemplary system 10 for providing personalized storm warnings in accordance with the present invention is illustrated in, and will be described in detail with reference to, FIG. 1. In accordance with the present invention, personalized storm warnings are generated by a main computer system 12 which communicates, e.g., via a network connection 14, with a user's computer 16. The main computer system 12 may be implemented as one or more conventional computers located at a television or radio station or newspaper which services a particular geographic area of the country. Alternatively, the main computer system 12 may provide personalized storm warnings in accordance with the present invention for individuals throughout a wider geographic area, e.g., the entire country. The user's computer 16 may be implemented in a conventional manner as a personal or handheld wireless computer, Web TV terminal, digital television system, or the like. Two-way communications between the main computer system 12 and the user's computer 16 may be provided over any suitable communications network or link 14. Alternatively, communications between the main computer 12 and the user's computer 16 may be via any known or future data broadcasting system 17. The main computer 12 may also or alternatively be in communication with a user's alphanumeric pager or cellular or other telephone 18, for providing personalized storm warnings to the user thereby, as will be discussed in more detail below.

Preferably, and conveniently, the main computer system 12 and the user's computer 16 may communicate with each other via the internet 14, using conventional and widely known internet communications formats, protocols, etc. The main computer system 12 and user's computer 16 may be connected to the internet 14 in a conventional manner via servers 19 and 20, respectively. Note that the server 19 providing an internet connection for the main computer system 12 may be separate from or an integral part of the main computer system 12. The server 20 providing an internet connection for the user computer 16 may typically be provided by a commercial internet service provider. Communications between the user's computer 16 and the internet service provider's server 20 may typically be accomplished using a modem connection for communication over conventional telephone lines, cable television lines, or other physical or radio links 22. It should be understood that the main computer system 12 may provide personalized storm warnings to many user computers 16 connected to the main computer system 12 over the internet 14. For example, a single internet service provider's server 20 may provide a connection to the main computer 12 over the internet 14 for many user computers 16, and an essentially unlimited number of servers 20 may be on the internet 14.

As mentioned above, the main computer system 12 may be implemented in a conventional manner using a single computer or multiple computers that work together to perform the functions required. The main computer system 12 may include conventional computer peripheral devices (not shown), including input and output devices such as keyboards, mouses, monitors, printers, etc. The main computer system 12 will also include conventional computer memory devices, including disk or tape storage devices for storing the computer programs which will be run on the main computer system 12 to implement a method for providing personalized storm warnings in accordance with the present invention. Memory, e.g., disk storage space, etc., is also provided for the storage of databases of information which is employed by the programs running on the main computer system 12 for generating personalized storm warnings. Such databases may include a geographic location database 24, a user profile database 26, and a storm track database 28. The use of each of these databases 24, 26, and 28 in generating personalized storm warnings in accordance with the present invention will be described in detail below. It should be noted that information in each database 24, 26, and 28 may be stored in its own memory device, e.g., disk, or together on the same disk or other memory device. Memory capacity 29 is preferably also provided for storing personalized storm warning reports generated by the computer 12 in the form of personalized user internet web pages, as will be described in more detail below.

In accordance with the present invention, the main computer system 12 is programmed, using conventional programming techniques, to perform various functions to provide personalized storm warnings to users. Such functions to be performed by the main computer 12 include a storm track generator function, a user profile generator function, and a personalized storm warning generator function. Each of these functions will be described in more detail below.

Any known system or method for generating accurate storm tracks may be employed to implement the storm track generator function. Preferably, the storm tracks generated by such a method implemented in the main computer 12 provide both an accurate indication of the location and predicted movement of storm cells, as well as detailed storm attribute information describing the severe weather conditions of the storm.

The main computer system 12 is preferably adapted to receive weather information from a variety of sources, from which accurate storm tracks may be generated. Such sources of weather information may include NEXRAD weather radar information 30, as well as live radar data 32. NEXRAD weather data 30 is provided by the government. NEXRAD information 30 includes a storm attributes table which defines storm cells and provides detailed information concerning the cells, including the characteristics of the cells (e.g., hail and vortex intensity and location, rain fall intensity, speed, etc.), as well as the position, direction, and speed of movement of the cells. NEXRAD data is obtained from a volumetric scan of the atmosphere, and is provided to the main computer system 12 on a periodic basis, e.g., approximately every six minutes.

Live radar data 32 may be provided to the main computer system 12 from one or more local or remotely located radar systems. Live radar data 32 preferably provides real time radar sweep information to the main computer system 12 much more often than NEXRAD information is provided to the system 12. For example, a conventional radar sweep may generally be completed in 30 seconds to 90 seconds. If the live radar 32 is operating to scan only a selected sector of interest, live radar information for the sector may be provided as often as every 10 seconds. Although NEXRAD 30 and live radar 32 are both radar sources, NEXRAD information is provided from much more expensive and powerful radars and information processing systems than conventional live radar. Thus, NEXRAD radar information is much more detailed, but less timely than live radar information.

Other sources of weather information which may be provided to the main computer system 12 include National Weather Service weather wire information 33, including weather warning bulletins authored by the National Weather Service Storm Prediction Center, and other related government agencies, as well as satellite imagery 34, including high resolution visible and infrared satellite imagery. Live lightening strike data 35, and readings from remote weather sensors 36, providing, e.g., live wind speed and other live weather information, may also be provided to the main computer system 12. As will be discussed in more detail below, detailed and accurate storm tracks may be generated from NEXRAD information alone, or, preferably, from NEXRAD information in combination with other weather information, such as live radar information.

The main computer system 12 may receive NEXRAD data from multiple NEXRAD sites. The storm data received from such multiple sites may overlap. For example, data for a single storm cell may appear in NEXRAD storm attributes tables from more than one site. Often, the storm attribute data for a single storm cell provided from different sites may not be identical. In such a case, the main computer 12 preferably selects the attributes which are likely to be most accurate for a particular storm cell for use in generating storm tracks in accordance with the present invention. For example, the computer 12 may automatically select information for a particular storm cell from a NEXRAD site which indicates the greatest storm intensity, or some other user selected characteristic, or combination of characteristics, for the cell. If information for a particular storm cell from more than one NEXRAD site indicates the same intensity, or other characteristics, for the storm cell, the information from the NEXRAD site nearest to the storm may be selected. Any other method for selecting the storm cell attributes for a particular storm cell for which storm cell attributes are being provided by more than one NEXRAD site may be employed.

Figure 2:
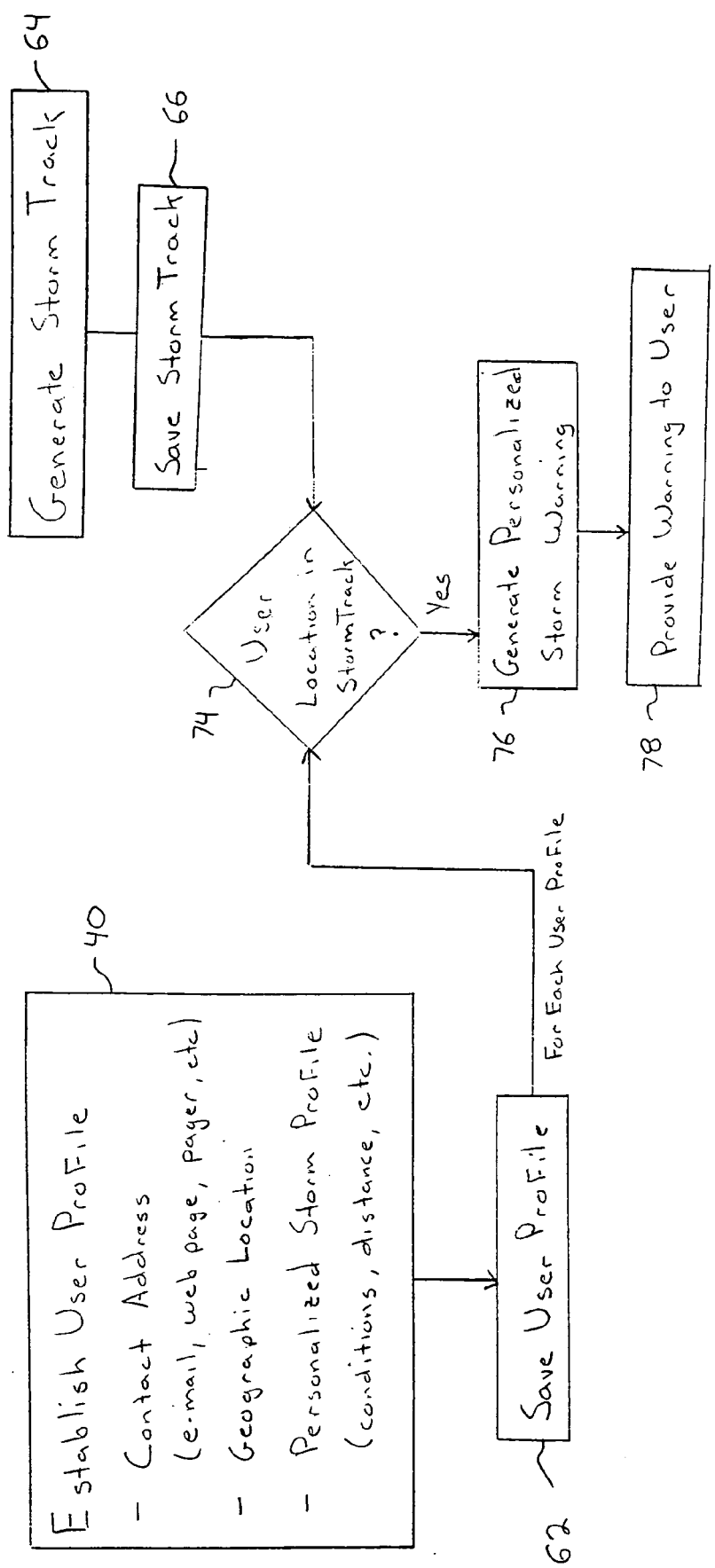
FIG. 2 is a schematic flow chart diagram of an exemplary method for providing personalized storm warnings in accordance with the present invention.

An exemplary method, employing the system 10 described with reference to FIG. 1, for providing personalized storm warnings to a user in accordance with the present invention, will now be describe in detail with reference to the exemplary flow chart diagram of FIG. 2. The process of providing a personalized storm warning to a user begins with the establishment of a user profile 40. A user profile may be established by each user individually. For example, a user may establish a user profile by connecting with the main computer system 12 over, e.g., the internet 14 via the user's computer 16.

The user profile generator function, running on the main computer system 12, may preferably provide a user profile set-up menu user interface as a web page which may be accessed by the user over the internet 14. An exemplary, and very simplified, user profile set-up menu user interface is illustrated at 42 in FIG. 3. The user profile set-up menu user interface 42 prompts a user to provide a name 44, contact address 46, and location identification 48. The page on which the user profile set-up menu user interface 42 is provided may also include advertisements and hypertext links to other web pages or sites on the internet, in a conventional manner.

The contact address 46 is an address to which the user would like his personalized storm warnings to be sent. This may be, for example, an internet e-mail address, for providing personalized storm warnings to the user's computer 16 over the internet 14. Alternatively, the contact address 46 may identify another destination or medium for transmitting personalized storm warnings to a user. For example, personalized storm warnings may be provided by the main computer system 12 to a user's alphanumeric pager or cellular telephone 18 (e.g., using a conventional voice synthesizer) (see FIG. 1), in which case the contact address 46 may be a pager or cell phone number. Alternatively, or additionally, the computer system 12 may automatically generate a personalized internet web page address, at which the user's personalized storm warning will be accessible, from the information provided by the user via the user profile set-up menu user interface 42. The user's personalized internet web page address may be provided to the user at the user's contact address 46. For example, the user's personalized internet web page address may be provided as an e-mail or phone message provided to the user at the user's contact address 46.

The location identification 48 is the geographical location for which the user is interested in receiving a detailed personalized storm warning. For example, the location may be the user's home or work location, or the location of business activity, such as a construction site. Various methods may be used for identifying the desired location. For example, the user may provide a street address or a United States Postal Service zip+4 code, either of which will identify a location of interest with sufficient detail. Preferably, the main computer system 12 converts the location 48 entered by the user in the user profile set-up menu user interface 42 into a lat./lon. coordinate. For this purpose, the main computer system 12 may employ a geographic location database 24, which may include a table or other data structure for converting street addresses, zip+4 codes, etc. to corresponding lat./lon. coordinates.

Preferably, a user also may be prompted to establish a storm profile, which defines the characteristics of storms for which the user desires a personalized storm warning to be provided. The storm profile, which may be established by the user using the user profile set-up menu user interface 42, may include both storm attribute characteristics, i.e., the severe weather conditions of a storm, as well as the amount of advanced warning with which a user desires a personalized storm warning to be provided. For example, a user may be prompted to select from several severe weather attributes which are characteristic of a storm. A list of severe weather attribute characteristics 50, e.g., tornado, hail, heavy rain, etc., may be listed on the user profile set-up menu user interface 42, with a check box 52 next to each attribute characteristic listed. By selecting a check box 52 next to a particular storm attribute characteristic, a user indicates that he only wishes a personalized storm warning to be provided if a storm approaching the user location of interest includes the severe weather storm attribute characteristics indicated. The user may also be prompted to select a degree of a particular storm attribute characteristic of a storm. For example, if a user is interested in receiving a personalized storm warning for storms including hail, the user may also be prompted to select a minimum hail size 54. Thus, a personalized a storm warning would only be provided, in such a case, if a storm approaching the user's location of interest includes hail, and if the hail is at least of the size indicated 54. A user may also be prompted to select a minimum probability that a particular storm attribute characteristic is present in a storm approaching the user's location of interest. For example, a user may employ the user profile set-up menu user interface 42 to indicate that he is interested in receiving a personalized storm warning only if the percentage likelihood of a particular storm attribute characteristic in a storm approaching his location of interest is at least a certain percentage (e.g., the percentage likelihood of a tornado in a storm approaching his location of interest is at least 25 percent, and the percentage likelihood of the presence of hail, having a size of at least a half-inch, is at least 75 percent). Of course, it should be understood that various storm attribute characteristics, degrees of such attribute characteristics, and probabilities of the presence of such attribute characteristics other than those illustrated by example in FIG. 3 may be made available for selection by a user in a user profile set-up menu user interface 42. The storm characteristics, degrees thereof, and probabilities of the presence thereof, which are made available for selection by a user will depend on the attribute characteristics of a storm which can be obtained from available weather information sources (e.g., NEXRAD 30, live radar 32, satellite imagery 34, lightening strike data 35, and live weather information from remote weather sensors 36) which are used by the main computer system 12 to track the storm. Thus, for example, a user may indicate in the storm profile that he is interested in receiving a personalized storm warning if lightening strikes are detected near the user's location of interest, if lightening strike data 35 is available to the main computer 12.

The user profile set-up menu user interface 42 may also prompt a user to indicate an advanced warning time or distance condition 56. The advanced warning time or distance condition 56, selected by a user, defines a predicted time from arrival at the designated user location of interest of a storm, or a current distance from the designated user location of interest of a storm, for which the user desires a personalized storm warning to be provided. A personalized storm warning may, therefore, be provided to a user only if the predicted arrival time of a storm at the user's location of interest is less than or equal to the indicated advanced warning time condition, or the current location of the storm is less than or equal to the advanced warning distance condition. The user may select between an advanced warning time or distance condition by selecting an appropriate check box 58 on the user profile set-up menu user interface 42. The user then specifies the specific advanced warning time or distance condition desired 60.

Having established a user profile, using the user profile set-up menu user interface 42, the user profile is saved 62 by the main computer system 12, e.g., in a user profile database 26. Of course, many individual user profiles may be established by individual users and saved by the main computer system 12 in the user profile database 26. A user is preferably able to change any user definable portion of his user profile at any time by re-accessing the user interface menu 42, e.g., over the Internet connection 14, and making any desired changes. For security purposes, a user may be requested to establish a user password upon initially establishing a user profile, and may be prompted to enter this password before being allowed to make any changes to a previously established user profile.

Periodically, or continuously, the main computer system 12 runs a storm tracking algorithm to generate storm tracks 64. The storm tracks generated preferably include detailed information concerning attribute characteristics of a storm (e.g., tornadic activity, hail, heavy precipitation, etc.) as well as the current location of the storm and a predicted path of the storm. Such a storm track may be generated using various known methods, using various different forms of weather information, e.g., weather information provided by NEXRAD 30, live radar 32, and other weather information services.

As discussed above, NEXRAD provides detailed information on the location, direction, speed, and other characteristics of a storm cell. Such data is updated approximately every 6 minutes. Therefore, for a system which generates storm tracks 64 exclusively from NEXRAD information 30, the step of generating storm tracks may be performed each time updated NEXRAD information 30 is received. Preferably, however, the positions of tracked storms are updated more frequently, i.e., between each receipt of new NEXRAD information, to provide a more accurate indication of storm position. Such updates may be based on the latest available NEXRAD information itself. For example, storm cell attributes, positions, and tracks may be advanced periodically between NEXRAD updates based on the storm heading and speed information provided in the most recent NEXRAD update.

During the time period between NEXRAD updates, however, the direction and speed of a storm cell can change significantly. This is particularly true for rapidly developing storm cells, for which accurate information concerning direction and speed of movement of the storm cell is most critical. Thus, a position and track of NEXRAD storm attributes based on NEXRAD data alone, even if updated periodically between NEXRAD updates, may become increasingly inaccurate as the time since the last NEXRAD update was provided increases. Therefore, the position and predicted track of detailed NEXRAD storm cell attributes is preferably updated between NEXRAD data updates by integrating the detailed storm cell information provided by NEXRAD 30 with live radar data 32 from local or remote radar sites. As discussed above, live radar scans can provide updated position information on storm cells at a rate of up to every 10 (for sector scans) to 90 seconds. A preferred method for updating the position and predicted track of NEXRAD storm cell attributes based on live radar information is described in detail in U.S. Pat. No. 6,339,747, entitled "Weather Tracking and Display System and Method," which is assigned to the assignee of the present application and is hereby incorporated herein by reference. The location of intensities and other characteristics of a storm cell provided in a NEXRAD storm attributes table may be advanced along a predicted line using the speed and direction of movement of the storm cell as determined from a live radar source 32 which is being fed to the storm track generator function running in the main computer system 12. This is achieved by linking or correlating a storm cell being tracked by live radar with the same storm cell as identified in the latest available NEXRAD information. Preferably, each time a live radar 32 scans a weather cell, the new location of the weather cell attributes defined by NEXRAD may be determined. A new storm track is then generated, extending from the updated location, using the attributes for the storm cell as provided by the NEXRAD storm attributes table, but starting from the new location determined by the live radar data, or using new speed and heading information determined from the live radar data. This updating may continue with each sweep of the live radar. Therefore, the step of generating storm tracks 64 may be performed substantially continuously, e.g., each time a storm cell is scanned by a live radar 32. When the next NEXRAD radar update is received, the attributes of the storm cell are updated, and the NEXRAD defined storm cell re-linked or correlated to the corresponding storm cell in live radar data. Thus, improved accurate tracking of detailed storm cell information may be provided using integrated NEXRAD and live radar data.

Figures 4, 5:
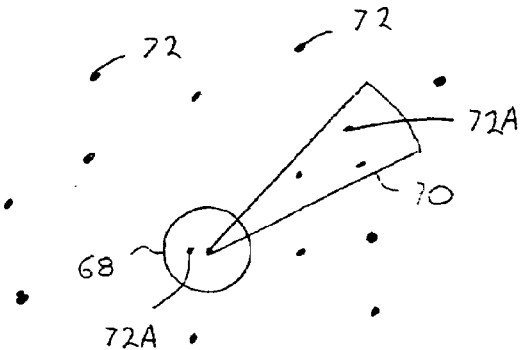
FIG. 4 is a schematic illustration of a storm track in relation to individual user locations of interest for which personalized storm warnings in accordance with the present invention are to be provided.
FIG. 5. is an exemplary personalized e-mail storm warning provided in accordance with the present invention.

Detailed storm track information, however generated, is saved by the main computer system 12 into a storm track database 28 at 66. Saved storm track data from the storm track database 28 is combined with the user profile data in the user profile database 26 to generate a personalize storm warning for each user who has established a user profile. User profiles for many individual users will define many individual locations of interest for which users are interested in receiving personalized storm warnings. However, the storm tracks, if any, generated by the main computer system 12 may typically only affect a few of the thus-defined user locations of interest. For example, FIG. 4 illustrates, schematically, a storm cell 68, for which a position, storm cell characteristics and a track, in the form of a tracking wedge 70, indicating predicted movement of the storm cell 68, has been generated by the main computer system 12 based on current weather radar information. (It should be noted that the storm cell track may be generated in forms other than a tracking wedge 70.) User locations of interest 72, defined by individual users in their respective user profiles, are also indicated in FIG. 4, relative to the storm cell 68 and track 70. Note that typically only a few of the user locations of interest 72A are located within a storm cell 68 or predicted track 70. Thus, it is only necessary to generate personalized storm warnings in accordance with the present invention for those user locations of interest 72A located within the storm cell 68 or track 70. Therefore, the main computer system 12 preferably first combines the storm track data saved in the storm track database 28 with the user profile information stored in the user profile database 26 to determine 74, for each user profile, whether the user location of interest identified in the user profile is located within a detected storm cell 68 or track 70.

If a user location of interest is determined at 74 to be within a generated storm track, a personalized storm warning is generated by the main computer system 12 for that specified user location at 76. Note that the steps of determining whether a user designated location of interest is within a storm track, and generating personalized storm warnings therefore, may be performed automatically, for example, each time a new storm track is generated or updated by the storm track generator function of the main computer system 12.

The step 76 of generating a personalized storm warning may also include the step of comparing generated storm tracks, saved in the storm track database 28, with user defined storm profiles, saved in the user profile database 26, to determine if storms affecting individual user locations of interest also satisfy the storm profile conditions established by the user. A personalized storm warning need only be generated and provided to a user if the storm affecting a user location of interest satisfies the storm profile conditions established by the user for that location of interest, i.e., if the tracked storm includes the storm attribute characteristics established by the user, and if the predicted arrival time of the storm at the user's location of interest, or the current distance of the storm from the user's location of interest, satisfies the advanced warning conditions established by the user in the storm profile. If the storm profile conditions are satisfied, a personalized storm warning is generated for the user location of interest and provided to the user. Thus, a user is only provided with storm warnings for storms which affect the user's particular location of interest and which include storm attribute characteristics which are of interest to the user. Also, a personalized storm warning is provided to the user to provide a degree of advanced warning as selected by the user. Additional filtering, checking, or other functions may be performed to verify the appropriateness of generating a personalized storm warning in accordance with the present invention. For example, where multiple storms are approaching a user location of interest, multiple storm warnings may be included in a single personalized storm warning.

Personalized storm warnings, generated by the personalized storm warning generator function of the main computer system 12 at 76, may be provided to the user at 78. A personalized storm warning may be provided to a user at fixed or user selectable periods, e.g., every five or ten minutes, during the time when a storm threatens a user's location of interest, or with increasing frequency as a storm approaches the user's location of interest. Personalized storm warnings, in accordance with the present invention, may be provided to users in a variety of different ways. For example, a personalized storm warning may be delivered to a user at the contact address 46 provided by the user in the user profile set-up menu user interface 42. Thus, the computer system 12 may include a personalized storm warning generator which generates a personalized storm warning in the form of a text e-mail message which is sent to the user during the times when a storm threatens a user's location of interest.

An exemplary personalized storm warning e-mail message 80, which may be generated and delivered to a user in accordance with the present invention, is shown in FIG. 5. Note that a personalized storm warning e-mail message provided in accordance with the present invention may provide additional or different information, and may have a different format than, the message 80 shown by example in FIG. 5. (Additionally, the personalized storm warning e-mail message may include advertisements and hypertext links to web sites in a conventional manner.) The personalized storm warning e-mail message 80 includes information concerning the attributes 82 of the severe weather which is approaching a user's location of interest, as well as information 84 regarding the expected arrival time of such severe weather at the user's location of interest. The severe weather attribute information 82 may be extracted directly from the storm track information generated by the storm track generator function of the computer system 12 and stored in the storm track database 28. The severe weather arrival time information 84 may be derived from current location and speed and direction of movement information for a storm as stored in the storm track database 28, as well as the lat./lon. of the user location of interest as stored in the user profile database 26. The severe weather arrival time information 84 may be derived in a conventional manner from such information, e.g., by calculating a distance between the current lat./lon. position of a storm cell and the lat./lon. position of a user location of interest and dividing by the speed of movement of the storm cell in the direction from the current storm cell location to the user's location of interest. Note that the severe weather arrival information 84 may be presented as a time until arrival, a time of arrival, or as a current distance of the storm from the user's location of interest with an indication of the speed at which the storm is approaching the user's location of interest.

The personalized storm warning e-mail message 80 may be generated from a report form template. Individual storm attribute 82 and storm arrival 84 information, stored in the storm track database 28 by the personalized storm warning generator function, may be inserted thereby in the proper position in the template to generate the personalized storm warning message 80.

As discussed above, a personalized storm warning in accordance with the present invention may be provided in other than a text format to a contact address other than a computer. For example, the personalized storm warning may be provided as an oral report to a user's computer or telephone, using conventional voice synthesization technology. In addition to text, the personalized storm warning may include still or animated graphics of weather conditions at the selected location. Such graphics may be generated in a conventional manner from the available storm track information stored in the storm track database 28, and may be delivered as part of the personalized storm warning, or accessed from the personalized storm warning, e.g., by a hyperlink. Alternatively, or additionally, a personalized storm warning in accordance with the present invention may be provided as a personalized internet web page, which is accessible by a user at a user's personalized internet web page address which is provided to the user.

A system and method for providing personalized storm warnings in accordance with the present invention may be combined with a system and method for providing more long-range personalized weather forecast reports to a user for locations of interest to the user. For example, U.S. patent application Ser. No. 09/547,195, entitled "System and Method for Providing Personalized Weather Reports and the Like," filed Apr. 12, 2000, and assigned to the assignee of the present application, the specification of which is hereby incorporated herein by reference, describes a system and method which generates weather forecast reports which are precisely computed automatically for a particular individual user's geographic location of interest, e.g., home or work, and which may be provided automatically directly to the user. In this system, a user establishes an individualized user profile in which the user defines a particular location of interest (e.g., home or work), a contact address (e.g., e-mail address or pager number) to which the personalized weather report is to be delivered and weather conditions of interest. A detailed and accurate weather forecasting model is run to provide high geographical and temporal resolution forecast data. This high resolution forecast data is compared to the individual user profile and a personalized weather report for the particular location, times, and conditions of interest to the user is generated and provided directly to the user, e.g., via e-mail. A system and method in accordance with the present invention for providing personalized storm warnings for individual locations of interest, based, e.g., on current weather radar information, may be combined with such a system and method. In such a case, for example, a user may establish a single user profile for a location of interest, for which both relatively long-range personalized weather forecasts and personalized storm warnings in accordance with the present invention may be provided.

It should be understood that the present invention is not limited to the particular embodiments and examples illustrated and described herein, but embraces all such modified forms thereof as come within the scope of the following claims.

What is claimed is:

1. A method for generating a personalized storm warning, comprising the steps of:
   (a) establishing a user profile including a user defined location of interest and at least one storm profile condition;
   (b) receiving first weather information from a first weather information source;
   (c) generating automatically a storm track of severe weather conditions from the first weather information;
   (d) generating a personalized storm warning for the user location of interest automatically from the user profile and the storm track by comparing the user defined location of interest directly to the storm track of severe weather conditions to determine whether the user defined location of interest is within the storm track and generating the personalized storm warning if the user defined location of interest is determined to be within the storm track and the severe weather conditions satisfy the at least one storm profile condition; and
   (e) providing the personalized storm warning to the user.

2. The method of claim 1 wherein the step of establishing a user profile includes the step of providing a user profile set-up menu user interface.

3. The method of claim 1 wherein the step of establishing a user profile includes the step of establishing a user contact address and wherein the step of providing a personalized storm warning to the user includes the step of delivering the personalized storm warning to the user contact address.

4. The method of claim 3 wherein the user contact address is an e-mail address, the step of generating a personalized storm warning includes the step of generating a personalized storm warning e-mail message, and the step of delivering the personalized storm warning includes the step of sending the personalized storm warning e-mail message to the user contact e-mail address.

5. The method of claim 3 wherein the user contact address is a phone number, the step of generating a personalized storm warning includes the step of generating a personalized storm warning voice message, and the step of delivering the personalized storm warning to a user includes the step of sending the personalized storm warning voice message to a phone at the user contact phone number.

6. The method of claim 3 wherein the user contact address is a pager number, the step of generating the personalized storm warning includes the step of generating a personalized storm warning text message, and the step of delivering the personalized storm warning to a user includes the step of sending the personalized storm warning text message to a pager at the user contact pager number.

7. The method of claim 1 wherein the first weather information source is NEXRAD.

8. The method of claim 1 wherein the step of generating a storm track of severe weather conditions from a first weather information source includes the steps of receiving first weather information periodically from the first weather information source, determining a current position of a storm cell from the first weather information periodically each time the first weather information is received, determining an updated current position of the storm cell at least once between each reception of the first weather information, and determining a predicted track of the storm cell extending from the determined current position of the storm cell.

9. The method of claim 8 wherein the step of determining an updated current position of the storm cell includes the step of determining an updated current position of the storm cell based on direction and speed of movement information for the storm cell contained in most recently received first weather information.

10. The method of claim 8 wherein the step of determining an updated current position of the storm cell includes the steps of receiving second weather information from a second weather information source at least once between each reception of the first weather information, the second weather information including an updated current location of the storm cell, and determining the updated current position of the storm cell from the second weather information.

11. The method of claim 10 wherein the second weather information source is live radar and the second weather information is live radar information.

12. The method of claim 1 wherein the step of generating a personalized storm warning for the user location of interest includes the step of determining arrival time information for the severe weather conditions at the user defined location of interest, and wherein the personalized storm warning includes the arrival time information and an indication of the severe weather conditions.

13. The method of claim 1 wherein the step of providing the personalized storm warning to a user includes the step of providing the personalized storm warning to an addressable device.

14. The method of claim 1 comprising additionally the step of providing a personalized internet web page address to a user, and wherein the step of providing the personalized storm warning to a user includes the step of providing the personalized storm warning so as to be accessible at the personalized internet web page address.

15. A personalized storm warning generating system, comprising:
   (a) user profile generator means for establishing a user profile including a user defined location of interest and at least one storm profile condition;
   (b) means for receiving first weather information from a first weather information source;
   (c) storm track generator means for generating automatically a storm track of severe weather conditions from the first weather information; and
   (d) storm warning generator means for generating a personalized storm warning for the user location of interest automatically from the user profile and the storm track by comparing the user defined location of interest directly to the storm track of severe weather conditions to determine whether the user defined location of interest is within the storm track and generating the personalized storm warning if the user defined location of interest is determined to be within the storm track and the severe weather conditions satisfy the at least one storm profile condition.

16. The personalized storm warning generating system of claim 15 comprising additionally means for providing the personalized storm warning to an addressable device.

17. The personalized storm warning generating system of claim 15 comprising additionally means for delivering the personalized storm warning to a user contact address.

18. The personalized storm warning generating system of claim 17 wherein the user contact address is an e-mail address and the storm warning generator means is adapted to generate a personalized storm warning e-mail message.

19. The personalized storm warning generating system of claim 17 wherein the user contact address is a phone number and the storm warning generator means is adapted to generate a personalized storm warning voice message.

20. The personalized storm warning generating system of claim 17 wherein the user contact address is a pager number and the storm warning generator means is adapted to generate a personalized storm warning text message.

21. The personalized storm warning generating system of claim 15 wherein the first weather information source is NEXRAD.

22. The personalized storm warning generating system of claim 15 wherein the storm track generator means includes means for receiving first weather information periodically from the first weather information source, means for determining a current position of a storm cell from the first weather information periodically each time the first weather information is received, means for determining an updated current position of the storm cell at least once between each reception of the first weather information, and means for determining a predicted track of the storm cell extending from the determined current position of the storm cell.

23. The personalized storm warning generating system of claim 22 wherein the means for determining an updated current position of the storm cell includes means for determining an updated current position of the storm cell based on direction and speed of movement information for the storm cell contained in most recently received first weather information.

24. The personalized storm warning generating system of claim 22 wherein the means for determining an updated current position of the storm cell includes means for receiving second weather information from a second weather information source at least once between each reception of the first weather information, the second weather information including an updated current location of the storm cell, and means for determining the updated current position of the storm cell from the second weather information.

25. The personalized storm warning generating system of claim 24 wherein the second weather information source is live radar and the second weather information is live radar information.

26. The personalized storm warning generating system of claim 15 wherein the storm warning generator means includes means for determining arrival time information for the severe weather conditions at the user defined location of interest, and wherein the personalized storm warning includes the arrival time information and an indication of the severe weather conditions.

27. The personalized storm warning generating system of claim 15 comprising additionally means for providing a personalized internet web page address to a user, and means for providing the personalized storm warning as a web page accessible at the personalized internet web page address.

* * * * *